United States Patent
Block et al.

(10) Patent No.: US 7,473,372 B2
(45) Date of Patent: Jan. 6, 2009

(54) OXIDATION OF ORGANIC COMPOUNDS

(75) Inventors: Philip A. Block, Chester Heights, PA (US); Dalbir S. Sethi, Cranbury, NJ (US); Richard A. Brown, Lawrenceville, NJ (US); David S. Robinson, Mount Laurel, NJ (US)

(73) Assignee: FMC Corporation, Philadelphia, PA (US)

( * ) Notice: Subject to any disclaimer, the term of this patent is extended or adjusted under 35 U.S.C. 154(b) by 339 days.

(21) Appl. No.: 10/518,248

(22) PCT Filed: Jun. 25, 2003

(86) PCT No.: PCT/US03/20114

§ 371 (c)(1),
(2), (4) Date: Jul. 25, 2005

(87) PCT Pub. No.: WO2004/002902

PCT Pub. Date: Jan. 8, 2004

(65) Prior Publication Data

US 2005/0258110 A1    Nov. 24, 2005

(51) Int. Cl.
    *C02F 1/72* (2006.01)
(52) U.S. Cl. .............. 210/747; 210/759; 210/763; 210/908; 405/128.75
(58) Field of Classification Search ............ 210/749, 210/759, 763, 908, 909, 747; 423/585; 405/128.5, 405/263, 128.75, 129.25; 588/205; 252/186.1, 252/186.25
See application file for complete search history.

(56) References Cited

U.S. PATENT DOCUMENTS

| 5,419,840 | A | 5/1995 | Fyson |
|---|---|---|---|
| 5,700,107 | A | 12/1997 | Newton |
| 5,741,427 | A | 4/1998 | Watts et al. |
| 5,877,389 | A | 3/1999 | Sorokin et al. |
| 6,019,548 | A | 2/2000 | Hoag et al. |
| 6,120,698 | A | 9/2000 | Rounds et al. |
| 6,160,194 | A | 12/2000 | Pignatello |
| 6,319,328 | B1 | 11/2001 | Greenberg et al. |
| 6,474,908 | B1 | 11/2002 | Hoag et al. |
| 6,569,353 | B1 | 5/2003 | Giletto et al. |
| 6,576,144 | B1 | 6/2003 | Vineyard |
| 6,663,781 | B1 | 12/2003 | Huling et al. |
| 7,160,483 | B1 | 1/2007 | Hince |
| 2006/0054570 | A1* | 3/2006 | Block et al. ............ 210/759 |
| 2007/0189855 | A1* | 8/2007 | Sethi et al. ............ 405/128.75 |

FOREIGN PATENT DOCUMENTS

| EP | 0 590 711 | 4/1994 |
|---|---|---|
| WO | WO 98/28044 | 7/1998 |

OTHER PUBLICATIONS

Sun, et al., "Chemical Treatment of Pesticide Wastes. Evaluation of Fe(III) Chelates for Catalytic Hydrogen Peroxide Oxidation of 2,4-D at Circumneutral pH," J. Agric. Food Chem., American Chemical Society, p. 322-327, (1992).
Glaze, et al., "Chemical Models of Advanced Oxidation Processes," Water Poll. Res. J. Canada, vol. 27 (No. 1), p. 23-42, (1992).
Mehrvar, et al., "Photocatalytic Degradation of Aqueous Organic Solvents in the Presence of Hydroxyl Radical Scavengers," International Journal of Photoenergy, p. 187-191, (2001).
Schumb, et al., Hydrogen Peroxide, Reinhold Publishing Corporation (New York, NJ), p. 467-476, (1955).

* cited by examiner

*Primary Examiner*—Frank M Lawrence

(57) ABSTRACT

An improved method for treating organic compounds present in soil, groundwater and other environments is disclosed. The method involves the use of a peroxygen compound and a chelated transition metal.

16 Claims, No Drawings

OXIDATION OF ORGANIC COMPOUNDS

FIELD OF THE INVENTION

The present invention relates to the in situ and ex situ oxidation of organic compounds in soils, groundwater, process water and wastewater and especially relates to the in situ oxidation of volatile and semi-volatile organic compounds, pesticides and herbicides, and other recalcitrant organic compounds in soil and groundwater.

BACKGROUND OF THE INVENTION

The presence of volatile organic compounds (VOCs), semi volatile organic compounds (SVOCs) or pesticides in subsurface soils and groundwater is a well-documented and extensive problem in industrialized and industrializing countries. Many VOC's and SVOC's are compounds which are toxic or carcinogenic, are often capable of moving through the soil under the influence of gravity and serving as a source of water contamination by dissolution into water passing through the contaminated soil. These include, but are not limited to, chlorinated solvents such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

In many cases discharge of these compounds into the soil leads to contamination of aquifers resulting in potential public health impacts and degradation of groundwater resources for future use. Treatment and remediation of soils contaminated with VOC or SVOC compounds have been expensive, require considerable time, and in many cases incomplete or unsuccessful. Treatment and remediation of volatile organic compounds that are either partially or completely immiscible with water (i.e., Non Aqueous Phase Liquids or NAPLs) have been particularly difficult. Also treatment of highly soluble but biologically stable organic contaminants such as MTBE and 1,4-dioxane are also quite difficult with conventional remediation technologies. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes through volatilization from groundwater.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 .mu.g/L, while the maximum concentration limits for chlorobenzenes, polychlorinated biphenyls (PCBs), and ethylene dibromide have been established by the USEPA at 100 .mu.g/L, 0.5 .mu./L, and 0.05 .mu.g/L, respectively. Meeting these cleanup criteria is difficult, time consuming, costly, and often virtually impossible using existing technologies.

U.S. Pat. No. 6,474,908 (Hoag, et al) and U.S. Pat. No. 6,019,548 (Hoag et al) teach the use of persulfate with divalent transition metal salts for the destruction of volatile organic compounds in soil. A disadvantage of this technique is that upon oxidation and/or hydrolysis, the divalent metals, added as a catalyst, may undergo oxidation and precipitation, limiting the survivability and transport of the catalyst, and hence the reactivity of the persulfate to the entire field of contamination.

Iron (III) has been known to catalyze the reactions of hydrogen peroxide. (*Hydrogen Peroxide*; Schumb, W. C.; Satterfield, C. N.; and Wentworth, R. L.; Reinhold Publishing Corporation, New York, N.Y., 1955; pg 469). Iron (III) complexes used with hydrogen peroxide, have been reported to show an ability to oxidize complex pesticides (Sun, Y and Pignatello, J. J. Agr. Food. Chem, 40:322-37, 1992). However Iron (III) is a poor catalyst for the activation of persulfate.

SUMMARY OF THE INVENTION

The present invention relates to a method for the treatment of contaminated soil, sediment, clay, rock, and the like (hereinafter collectively referred to as "soil") containing volatile organic compounds, semi-volatile organic compounds, pesticides and herbicides, as well as the treatment of contaminated groundwater (i.e., water found underground in cracks and spaces in soil, sand and rocks), process water (i.e., water resulting from various industrial processes) or wastewater (i.e., water containing domestic or industrial waste, often referred to as sewage) containing these compounds.

The method of the present invention uses one or more water soluble oxidants in combination with a chelated transition metal catalyst under conditions which enable oxidation of most, and preferably substantially all, the organic compounds in the soil, groundwater, process water and/or wastewater.

The oxidant may be any solid phase, water soluble peroxygen compound, introduced into the soil or water in amounts, under conditions and in a manner which assures that the oxidizing compound is able to contact and oxidize most, and preferably substantially all, the target compounds.

The chelated transition metal catalyst may be composed of divalent or trivalent cationic species of a transition metal. Examples include, but are not limited to, iron, copper, manganese, nickel, chromium, vanadium, silver and zinc. The transition metals can be complexed by a variety of chelants that are known in the literature. Examples of suitable chelants include, but are not limited to; ethylenediaminetetraacetic acid (EDTA), hydroxyacetic acid, phthalate, phosphate, pyrophosphate, metaphosphate, 1,2-benzenediol, citrate, nitriloacetic acid, tetrahydroxy-1,4-quionone, 1,2-dihydroxynaphthalene, hydroxyethylene diphosphonic acid, maleate, ascorbate, and aspartate. By complexing the transition metal catalyst with a chelant, it has been found that the survivability of the catalyst is greatly enhanced, and also that trivalent transition metal cations may be used. As indicated above, in the absence of a chelant, divalent metal cations are converted to trivalent cations which react in the presence of water or carbonate to form insoluble hydroxides or carbonates which precipitate out and/or do not move in the soil with the oxidant thus resulting in the decrease of catalytic activity. Also without the presence of a chelant some trivalent metal cations are not effective catalysts.

DESCRIPTION OF THE PREFERRED EMBODIMENTS

In accordance with the process of the present invention, organic compounds are oxidized by contacting the organic compound with a composition comprising (a) a water soluble peroxygen compound and (b) a chelated divalent or trivalent transition metal.

In one embodiment of the invention, the oxidation of organic compounds at a contaminated site is accomplished by the injection of a combination of a persulfate and a chelated transition metal catalyst into the soil.

In a preferred form of the invention, sodium persulfate ($Na_2S_2O_8$) is introduced into the soil.

For in situ soil treatment, injection rates must be chosen based upon the hydrogeologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame and to compensate for any decomposition of the oxidant. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and the present process is not different in that respect.

While sodium persulfate is the preferred peroxygen compound for oxidizing soil constituents in accordance with the present invention, other solid phase water soluble peroxygen compounds can be used. By "solid phase water soluble peroxygen compound" it is meant a compound that is solid and water soluble at room temperature and contains a bi-atomic oxygen group, O—O. Such compounds include all the dipersulfates, monopersulfates, peroxides, and the like, with the dipersulfates being preferred because they are inexpensive and survive for long periods in groundwater saturated soil under typical site conditions.

The most preferred dipersulfate is sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used. Potassium persulfate, however, is an order of magnitude less soluble in water than sodium persulfate; and ammonium persulfate is even less desirable as it may decompose into constituents such as ammonium ion which are potential health concerns.

The most preferred transition metal is iron, which can be used in either the divalent or trivalent state, as it is inexpensive, common to ground soils, and has low toxicity. The most preferred chelating agent is ethylene diamine tetraacetic acid (EDTA), However, any complexing agent, chelant or sequesterant common in the literature may be used. The chelant may be either an organic (carbon based) or inorganic compound (i.e., phosphates), or it may be a combination of inorganic and organic moieties such as organophosphates. Examples include but are not limited to: hydroxyacetic acid, phthalate, phosphate, pyrophosphate, metaphosphate, 1,2-benzenediol, citrate, nitriloacetic acid, tetrahydroxy-1,4-quionone, 1,2-dihydroxynaphthalene, hydroxyethylene diphosphonic acid, maleate, ascorbate, and aspartate. The chelant is added in sufficient quantity to insure at minimum complete complexation of the transition metal. Overdosing the chelant is not desirable as the excess chelant may increase the oxidant demand.

The preferred valence state of iron is the trivalent state as it is stable and does not require special handling. Divalent iron compounds are easily oxidized by ambient oxygen.

The chelant and the transition metal salt may be mixed together, shipped and stored prior to being combined with water in the same vessel and then injected. The peroxygen compound and chelant—metal combination likewise, may be mixed together and shipped or stored prior to being combined with water in the same vessel prior to injection. Solutions of the peroxygen compound and the chelated metal catalyst can be injected simultaneously or sequentially. If injected sequentially, it is preferable that the chelated metal catalyst is injected first. It is also preferred that enough peroxygen compound be injected as to satisfy the soil oxidant demand, compensate for any decomposition and oxidize and destroy the majority if not all of the organic compounds.

Depending upon the type of soil, target compounds, and other oxidant demand at the site, the concentrations of peroxygen compound used in the present invention may vary from 0.5 mg/L to greater than 250,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand, chemical (e.g. VOC) oxidant demand and the oxidant stability existing in the subsurface. The precise chemical compounds in the soil and their concentration can be determined. Contaminated groundwater can be collected. Oxidants can be added to the collected groundwater during laboratory treatability experiments to determine which compounds are destroyed, in what order and to what degree, in the groundwater. It can then be determined whether the same oxidants are able to destroy those chemicals in the soil environment.

One method for calculating the preferred amount of peroxygen compound to be used per unit soil mass (for an identified volume of soil at the site) is to first determine the minimum amount of peroxygen compound needed to fully satisfy soil oxidant demand per unit mass of uncontaminated soil. A contaminated soil sample from the identified volume of soil is then treated with that predetermined (per unit mass) amount of peroxygen compound; and the minimum amount of peroxygen compound required to eliminate the organic compounds in that treated sample is then determined. Chemical reaction stoichiometry governs the mass/mass ratios and thus the total amount required to achieve the desired result. In actuality the amount of peroxygen compound injected into various locations at a single contaminated site will vary depending upon what is learned from the core samples and other techniques for mapping what is believed to be the subsurface conditions.

The goal is for the concentration of peroxygen compound in the injected solution to be just enough to result in the peroxygen compound reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected peroxygen compound solution. Certain soils to be treated may be in unsaturated zones and the method of peroxygen compound injection may be based on infiltration or trickling of the peroxygen compound solution into the subsurface to provide sufficient contact of the soils with the injected chemicals.

Certain soils and conditions will require large amounts of peroxygen compound to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds, and also may cause a greater degree of decomposition of the peroxygen compound and thus have a higher overall soil oxidant demand.

The concentrations of the chelated transition metal catalyst used in the present invention may vary from 1 to 1000 ppm on a metal cation basis.

In addition to in situ applications the process may also be employed ex situ. In addition to soil it may be used to treat sludges, sands, tars, groundwater, wastewater, process water or industrial water.

In order to describe the invention in more detail, the following examples are set forth:

EXAMPLE 1

Study Demonstrating Efficacy of Fe(III)—EDTA and Sodium Persulfate

Solid sodium persulfate (3.95 grams) and transition metal (Fe(II) or Fe-EDTA) were added to 40 mL brown glass vials to obtain targeted concentrations.

Distilled water was added to the vial to contain zero headspace and the vial was capped with a teflon lined silicon rubber screw top to prevent loss of volatile organic compounds.

A mixture of the volatile organic compounds (VOC) (in methanol) was injected through the septum of the sealed vials into the water/oxidant/metal mixture.

Controls were constructed, without the addition of sodium persulfate.

All vials were stored at room temperature for 7 days.

Following 7 day reaction period, vials were stored at 4 deg C. for analysis.

Analyses were performed on a gas chromatograph/mass spectrometer utilizing USEPA SW-846, Method 8260B Reaction data were compared to control data in order to factor out any non-oxidative (i.e., volatile) losses that may have occurred The results are shown in the following table after 7 days of reaction:

|  | Percent Reduction Relative to Control | | |
| --- | --- | --- | --- |
| (VOC) | Fe(II) | Fe (III) | Fe-EDTA |
| 1,1-DCE | 100 | 96 | 100 |
| MTBE | 85.4 | 33 | 50.7 |
| cis-DCE | 100 | 52 | 100 |

-continued

|  | Percent Reduction Relative to Control | | |
| --- | --- | --- | --- |
| (VOC) | Fe(II) | Fe (III) | Fe-EDTA |
| Benzene | 100 | 78 | 99 |
| TCE | 100 | 57 | 100 |
| PCE | 100 | 47 | 100 |
| Toluene | 100 | 100 | 100 |
| Chlorobenzene | 100 | 74 | 100 |

This study demonstrates the ability of chelated trivalent iron to effectively destroy a variety of contaminant compounds.

EXAMPLE II

Study Demonstrating Effectiveness of Differing Chelants

Sodium persulfate was dissolved into distilled water to achieve a 10% w/v concentration. The persulfate solution was added to 20 mL volatile organic analysis (VOA) vials.

$FeCl_3$ was added to achieve a final concentration of 10 mM (550 mg Fe/L) into the vials targeted for the Fe(III) study. For comparison to Fe(II) with persulfate, $FeSO_4$ was added to achieve a final concentration of 9 mM (500 mg Fe/L) to the appropriate vials.

The following chelants were used.

| Cat | Catechol (1,2- benzenediol) | 0.92% w/v |
| --- | --- | --- |
| PhTh | Potassium hydrogen phthalate | 1.54% w/v |
| DHNAH | 1,2-dihyroxynaphthalene | 1.54% w/v |
| NTA | nitriloacetic acid | 1/61% w/v + 685 uL 30% NaOH |
| THQ | tetrahydroxy-1,4-quionone | 1.45% w/v + 450 uL 30% NaOH |
| EDTA | ethylenediaminetetraacetic acid | 3.57% w/v |
| GLY | hydroxyacetic acid | 0.94% w/v |

Distilled water was added to the vial to contain zero headspace and the vial was capped with a teflon lined silicon rubber screw top to prevent volatile loss A mixture of the volatile organic compounds (in methanol) was injected through the septum of the sealed vials into the water/oxidant/metal mixture. Controls identical to the reaction vials were constructed, one with the addition of sodium persulfate alone and one with sodium persulfate and an unchelated iron (II) sulfate.

All vials were stored at room temperature. Analyses were conducted after 7, 14 and 21 days. Analyses were performed on a gas chromatograph/mass spectrometer utilizing USEPA SW-846, Method 8260B.

The results with various organic compounds are shown in the following tables:

Carbon Tetracloride:

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 11,000 | 11,000 | 11,000 | 11,000 | 11,000 | 11,000 | 11,000 | 11,000 | 11,000 | 11,000 |
| 7 | 12,000 | 11,000 | 12,000 | 11,000 | 9,400 | 9,400 | 9,800 | 12,000 | 11,000 | 12,000 |
| 14 | 12,000 | 11,000 | 12,000 | 12,000 | 9,300 | 9,400 | 5,300 | 11,000 | 11,000 | 12,000 |
| 21 | 11,000 | 10,000 | 12,000 | 12,000 | 9,300 | 8,400 | 5,000 | 9,800 | 11,000 | 13,000 |

Methyl-t-Butyl ether

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 13,000 | 13,000 | 13,000 | 13,000 | 13,000 | 13,000 | 13,000 | 13,000 | 13,000 | 13,000 |
| 7 | 13,000 | 1,900 | 11,000 | 11,000 | 8,300 | 690 | 6,400 | 8,500 | 12,000 | 12,000 |
| 14 | 13,000 | 0 | 7,000 | 10,000 | 6,000 | 170 | 440 | 3,900 | 9,600 | 11,000 |
| 21 | 13,000 | 0 | 4,600 | 9,900 | 4,700 | 0 | 250 | 1,500 | 3,900 | 11,000 | t-Butyl Alcohol

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 15,000 | 15,000 | 15,000 | 15,000 | 15,000 | 15,000 | 15,000 | 15,000 | 15,000 | 15,000 |
| 7 | 15,000 | 11,000 | 15,000 | 15,000 | 15,000 | 3,800 | 15,000 | 15,000 | 17,000 | 16,000 |
| 14 | 16,000 | 1,100 | 14,000 | 18,000 | 12,000 | 1,700 | 3,600 | 13,000 | 15,000 | 15,000 |
| 21 | 14,000 | 830 | 13,000 | 11,000 | 14,000 | 1,600 | 3,300 | 8,900 | 8,900 | 20,000 |

Benzene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 13,000 | 13,000 | 13,000 | 13,000 | 13,000 | 13,000 | 13,000 | 13,000 | 13,000 | 13,000 |
| 7 | 7,000 | 0 | 1,600 | 880 | 0 | 0 | 160 | 0 | 2,800 | 3,400 |
| 14 | 2,800 | 0 | 0 | 380 | 0 | 0 | 0 | 0 | 240 | 1,300 |
| 21 | 940 | 0 | 0 | 200 | 0 | 0 | 0 | 0 | 0 | 690 |

Ethylbenzene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 13,000 | 13,000 | 13,000 | 13,000 | 13,000 | 13,000 | 13,000 | 13,000 | 13,000 | 13,000 |
| 7 | 5,600 | 0 | 0 | 0 | 0 | 0 | 0 | 0 | 0 | 0 |
| 14 | 1,300 | 0 | 0 | 0 | 0 | 0 | 0 | 0 | 0 | 0 |
| 21 | 240 | 0 | 0 | 0 | 0 | 0 | 0 | 0 | 0 | 0 |

Toluene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 13,000 | 13,000 | 13,000 | 13,000 | 13,000 | 13,000 | 13,000 | 13,000 | 13,000 | 13,000 |
| 7 | 5,000 | 0 | 0 | 0 | 0 | 0 | 0 | 0 | 0 | 0 |
| 14 | 1,100 | 0 | 0 | 0 | 0 | 0 | 0 | 0 | 0 | 0 |
| 21 | 190 | 0 | 0 | 0 | 0 | 0 | 0 | 0 | 0 | 0 | m,p-Xylene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 7,800 | 7,800 | 7,800 | 7,800 | 7,800 | 7,800 | 7,800 | 7,800 | 7,800 | 7,800 |
| 7 | 2,600 | 0 | 0 | 0 | 0 | 0 | 0 | 0 | 0 | 0 |
| 14 | 400 | 0 | 0 | 0 | 0 | 0 | 0 | 0 | 0 | 0 |
| 21 | 0 | 0 | 0 | 0 | 0 | 0 | 0 | 0 | 0 | 0 |

Chlorobenzene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 11,000 | 11,000 | 11,000 | 11,000 | 11,000 | 11,000 | 11,000 | 11,000 | 11,000 | 11,000 |
| 7 | 7,100 | 0 | 2,000 | 1,200 | 310 | 0 | 0 | 0 | 3,100 | 4,100 |
| 14 | 3,100 | 0 | 0 | 550 | 180 | 0 | 0 | 0 | 350 | 2,100 |
| 21 | 1,300 | 0 | 0 | 290 | 0 | 0 | 0 | 0 | 0 | 1,100 |

1,2-Dichlorobenzene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 12,000 | 12,000 | 12,000 | 12,000 | 12,000 | 12,000 | 12,000 | 12,000 | 12,000 | 12,000 |
| 7 | 8,900 | 0 | 7,600 | 4,100 | 1,400 | 610 | 3,500 | 3,900 | 8,300 | 7,200 |
| 14 | 5,300 | 0 | 3,000 | 3,300 | 1,200 | 0 | 180 | 880 | 5,700 | 6,100 |
| 21 | 3,400 | 0 | 880 | 2,600 | 1,100 | 0 | 110 | 190 | 380 | 5,000 |

1,3-Dichlorobenzene

| Elapsed Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 12,000 | 12,000 | 12,000 | 12,000 | 12,000 | 12,000 | 12,000 | 12,000 | 12,000 | 12,000 |
| 7 | 8,300 | 0 | 6,700 | 3,000 | 1,300 | 0 | 1,400 | 2,500 | 7,400 | 6,000 |
| 14 | 4,200 | 0 | 2,400 | 2,100 | 1,000 | 0 | 0 | 330 | 4,320 | 4,100 |
| 21 | 2,800 | 0 | 620 | 1,400 | 940 | 0 | 0 | 320 | 320 | 2,500 |

1,2,4-Trichlorobenzene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 9,100 | 9,100 | 9,100 | 9,100 | 9,100 | 9,100 | 9,100 | 9,100 | 9,100 | 9,100 |
| 7 | 5,800 | 0 | 5,300 | 4,000 | 280 | 690 | 3,100 | 3,900 | 5,600 | 4,100 |
| 14 | 3,100 | 0 | 3,200 | 3,500 | 250 | 250 | 250 | 1,700 | 4,300 | 3,400 |
| 21 | 1,800 | 0 | 1,600 | 2,900 | 240 | 170 | 250 | 570 | 1,600 | 2,700 |

1,1-Dichloroethene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 9,700 | 9,700 | 9,700 | 9,700 | 9,700 | 9,700 | 9,700 | 9,700 | 9,700 | 9,700 |
| 7 | 5,700 | 0 | 0 | 0 | 0 | 0 | 0 | 0 | 0 | 0 |
| 14 | 2,400 | 0 | 0 | 0 | 0 | 0 | 0 | 0 | 0 | 0 |
| 21 | 1,000 | 0 | 0 | 0 | 0 | 0 | 0 | 0 | 0 | 0 | cis-1,2,Dichloroethene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 10,000 | 10,000 | 10,000 | 10,000 | 10,000 | 10,000 | 10,000 | 10,000 | 10,000 | 10,000 |
| 7 | 8,200 | 0 | 1,500 | 1,400 | 130 | 0 | 0 | 0 | 2,100 | 3,100 |
| 14 | 5,200 | 0 | 0 | 640 | 0 | 0 | 0 | 0 | 540 | 1,700 |
| 21 | 3,600 | 0 | 0 | 320 | 0 | 0 | 0 | 0 | 0 | 700 | trans-1,2-Dichloroethene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 2,400 | 2,400 | 2,400 | 2,400 | 2,400 | 2,400 | 2,400 | 2,400 | 2,400 | 2,400 |
| 7 | 1,700 | 0 | 390 | 350 | 0 | 0 | 0 | 0 | 560 | 670 |
| 14 | 860 | 0 | 0 | 160 | 0 | 0 | 0 | 0 | 130 | 290 |
| 21 | 530 | 0 | 0 | 0 | 0 | 0 | 0 | 0 | 0 | 120 |

Trichloroethene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 11,000 | 11,000 | 11,000 | 11,000 | 11,000 | 11,000 | 11,000 | 11,000 | 11,000 | 11,000 |
| 7 | 7,700 | 0 | 2,000 | 1,600 | 240 | 100 | 0 | 150 | 3,200 | 3,100 |
| 14 | 4,000 | 0 | 110 | 730 | 110 | 0 | 0 | 0 | 550 | 1,100 |
| 21 | 2,400 | 0 | 0 | 350 | 0 | 0 | 0 | 0 | 0 | 360 |

Tetrachloroethene

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 11,000 | 11,000 | 11,000 | 11,000 | 11,000 | 11,000 | 11,000 | 11,000 | 11,000 | 11,000 |
| 7 | 7,600 | 0 | 6,900 | 3,700 | 2,700 | 300 | 2,900 | 3,600 | 6,900 | 6,600 |
| 14 | 3,500 | 0 | 2,600 | 2,600 | 2,500 | 150 | 140 | 570 | 5,100 | 5,500 |
| 21 | 2,300 | 0 | 660 | 1,700 | 1,700 | 110 | 0 | 0 | 260 | 3,700 |

1,4-Dioxane

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 19,000 | 19,000 | 19,000 | 19,000 | 19,000 | 19,000 | 19,000 | 19,000 | 19,000 | 19,000 |
| 7 | 17,000 | 0 | 9,600 | 10,000 | 3,900 | 0 | 0 | 2,200 | 8,800 | 12,000 |
| 14 | 14,000 | 0 | 2,100 | 8,400 | 1,500 | 0 | 0 | 0 | 8,300 | 7,300 |
| 21 | 17,000 | 0 | 0 | 7,800 | 0 | 0 | 0 | 0 | 0 | 7,200 |

4-Methyl-2-Pentanone

| Elpased Time, days | Persulfate | Persulfate + Fe(II) | Persulfate + Fe(III) | Persulfate + Fe(III) + Cat | Persulfate + Fe(III) + DHNAH | Persulfate + Fe(III) + THQ | Persulfate + Fe(III) + EDTA | Persulfate + Fe(III) + GLY | Persulfate + Fe(III) + NTA | Persulfate + Fe(III) + PhTh |
|---|---|---|---|---|---|---|---|---|---|---|
| 0 | 14,000 | 14,000 | 14,000 | 14,000 | 14000 | 14,000 | 14,000 | 14,000 | 14,000 | 14,000 |
| 7 | 13,000 | 880 | 11,000 | 11,000 | 7,000 | 150 | 4,600 | 6,700 | 13,000 | 11,000 |
| 14 | 14,000 | 0 | 5,000 | 12,000 | 4,200 | 0 | 170 | 2,200 | 9,400 | 9,700 |
| 21 | 14,000 | 250 | 2,000 | 9,000 | 2,600 | 0 | 0 | 410 | 1,600 | 7,100 |

This study demonstrates the ability of chelated iron to effectively destroy a variety of contaminants.

EXAMPLE III

Study Demonstrating the Effects of Catalyst Dosage at Elevated pH

The study was conducted in VOA 40 mL vials. The vials were dosed with a stock contaminant mixture made up in methanol consisting of chlorinated ethenes, aromatics, and other compounds (see table below), to approximately 10,000 ppm. To each vial was added 3.95 g of sodium persulfate, representing a 2× stoichiometric dose, including the available methanol.

Fe(III)-EDTA was added to each vial to achieve either a 100 mg/L or a 500 mg/L concentration of iron, except for control vials, which contained neither persulfate nor catalyst.

The pH was adjusted to approximately 9 with sodium carbonate.

All vials were stored at room temperature for 7 days.

Following the 7 day reaction period, the vials were stored at 4 deg C. for analysis.

Analyses were performed on a gas chromatograph/mass spectrometer utilizing USEPA SW-846, Method 8260B Reaction data were compared to data on the control vials in order to factor out any non-oxidative (i.e., volatile) losses that may have occurred

|  | Fe-EDTA | |
|---|---|---|
| mg/L Fe | 100 | 500 |
| % decomposition after 7 days | | |
| VC | 99 | 99 |
| 1,1-DCE | 99 | 99 |
| MTBE | 92 | 49 |
| hexane | 98 | 98 |
| c12-DCE | 99 | 99 |
| chloroform | 51 | 10 |
| 1,1,1-TCA | 42 | 19 |
| Benzene | 99 | 99 |
| TCE | 99 | 99 |
| toluene | 99 | 99 |
| PCE | 99 | 99 |
| chlorobenzene | 99 | 99 |
| total VOC's | 87 | 74 |
| total ethenes | 99 | 99 |
| total aromatics | 99 | 99. |

The data demonstrates that for ethenes and aromatics, the degree of contaminant degradation is insensitive to the level of catalyst added. However, for several of the VOC's, an increase in catalyst is actually detrimental to the elimination of the VOC, indicating that the level of catalyst needs to be selected for the particular VOC or VOC mixture to be treated.

EXAMPLE IV

Comparison of the Long Term Effectiveness of Iron II and Fe-EDTA in a Soil Environment Iron II salts lose their effectiveness in a soil environment due to their oxidation to iron III and the subsequent precipitation of iron III as an insoluble hydroxide or carbonate. One of the advantages of using chelated iron III complexes (such as Fe-EDTA) is that they are 1) already oxidized and 2) will remain soluble over a wide pH range. Thus chelated iron III complexes potentially will transport with persulfate and continue to function as an activator.

A series of experiments were conducted to compare the long-term effectiveness of different activators. A 40% soil water slurry was dosed with persulfate (1 gram/250 ml of water) and different activators. It was dosed with a mixture of 1,4-Dioxane, ter-butyl alcohol and MTBE. Both the persulfate and the contaminant mixture were redosed periodically. The water phase was analyzed periodically for the VOCs. The data was then plotted as a cumulative % degradation of the VOCs. The following table gives the results.

The water phase in the Fe II reaction started out as an orange color. Within 1 week it was clear. This is an indication that the iron II was oxidized and precipitated. By comparison the Fe-EDTA supernatant remained light orange over the course of the experiment.

As can be seen from the table the activity of Fe II decreases with time. After about 4 weeks the activity is flat. After 4 weeks most of the loss in total VOC (TVOC)s in the Fe II experiment can be attributed to the slow reaction of persulfate by itself. By contrast the Fe EDTA experiment shows a continual increase in TVOC oxidation.

|  | Week 1* | Week 3 | Week 5* | Week 7 | Week 8 |
|---|---|---|---|---|---|
| Ter-Butyl Alchohol, mg/L | | | | | |
| Control | 11 | 37 | 35 | 55 | 57 |
| No Fe | 12 | 35 | 31 | 45 | 37 |
| Fe II | 13 | 30 | 29 | 43 | 54 |
| Fe EDTA | 12 | 37 | 25 | 38 | 25 |
| 1,4-Dioxane, mg/L | | | | | |
| Control | 14 | 31 | 32 | 52 | 50 |
| No Fe | 13 | 27 | 34 | 38 | 35 |
| Fe II | 8 | 17 | 20 | 22 | 16 |
| Fe EDTA | 11 | 15 | 4.2 | 0 | 0 |
| MTBE, mg/L | | | | | |
| Control | 6.7 | 24 | 29 | 35 | 39 |
| No Fe | 6.4 | 20 | 18 | 29 | 26 |
| Fe II | 6.9 | 13 | 3.8 | 7.8 | 4 |
| Fe EDTA | 7 | 15 | 4.2 | 0 | 0 |
| TVOC, mg/L | | | | | |
| Control | 31.7 | 92 | 96 | 142 | 146 |
| No Fe | 31.4 | 82 | 83 | 112 | 98 |
| Fe II | 27.9 | 60 | 52.8 | 72.8 | 74 |
| Fe EDTA | 30 | 67 | 33.4 | 38 | 25 |
| % Change TVOC | | | | | |
| No Fe | 0.9 | 10.9 | 13.5 | 21.1 | 32.9 |
| Fe II | 12.0 | 34.8 | 45.0 | 48.7 | 49.3 |
| Fe EDTA | 5.4 | 27.2 | 65.2 | 73.2 | 82.9 |

*VOCs & Persulfate redosed

EXAMPLE V

Comparison of Iron Availability in Soil

Solutions of persulfate (500 mg/liter of water) and iron (Fe II and Fe-EDTA) were injected into a soil matrix at two separate sites. The concentration of the iron was then measured in monitoring wells at a distance downgradient of the injection well. The following table shows that un-chelated divalent iron does not transport from the point of injection, while chelated iron does.

| Iron Catalyst | Initial Concentration as Fe, mg/L | Distance from injection point, m | Concetration of iron, mg/L as Fe |
|---|---|---|---|
| Ferrous Sulfate (divalent iron - unchelated) | 187 | 1.5 | 0.287 |
| Fe-EDTA | 100 | 5 | 75-100[1] |

[1]Estimated based on color observed

The invention claimed is:

1. A method of oxidizing an organic compound present in soil, groundwater, process water or wastewater said method comprising contacting the organic compound with a composition comprising a persulfate, and a chelated metal catalyst composed of divalent or trivalent cationic species of iron.

2. A method as in claim 1, wherein the organic compound is present in soil, groundwater, or wastewater.

3. A method as in claim 1, wherein the organic compound is selected from the group consisting of volatile organic compounds, semi-volatile organic compounds, polyaromatic hydrocarbons, polychlorobiphenyls, pesticides and herbicides.

4. The method as in claim 1, wherein the persulfate is a dipersulfate.

5. The method as in claim 4, wherein the dipersulfate is selected from sodium, potassium or ammonium persulfate or a combination thereof.

6. The method as in claim 1, wherein the persulfate is a monopersulfate.

7. The method as in claim 6, wherein the monopersulfate is selected from sodium and potassium monopersulfate.

8. The method as in claim 1, wherein the persulfate is a combination of a dipersulfate and monopersulfate.

9. The method as in claim 1, wherein the iron is divalent.

10. The method as in claim 1, wherein the iron is trivalent.

11. The method as in claim 1, wherein the metal catalyst is chelated with ethylenediaminetetraacetic acid.

12. The method as in claim 1, wherein the amount of chelated metal catalyst is sufficient to deliver an equivalent amount of transition metal in the range of 1-1000 ppm.

13. The method as in claim 1, wherein the amount of persulfate is sufficient to satisfy the soil oxidant and to oxidize substantially all of the organic compound.

14. The method as in claim 1, wherein the chelated metal catalyst and the persulfate are added in combination.

15. The method as in claim 1, wherein the chelated metal catalyst and the persulfate are added sequentially.

16. The method as in claim 1, wherein the metal catalyst is chelated with citrate.

* * * * *